(12) United States Patent
Bezlepkin et al.

(10) Patent No.: US 10,030,865 B2
(45) Date of Patent: Jul. 24, 2018

(54) SYSTEM FOR PASSIVE HEAT REMOVAL FROM THE PRESSURIZED WATER REACTOR THROUGH THE STEAM GENERATOR

(71) Applicant: JOINT-STOCK COMPANY SCIENTIFIC RESEARCH AND DESIGN INSTITUTE FOR ENERGY TECHNOLOGIES ATOMPROEKT (JSC "ATOMPROEKT"), St. Petersburg (RU)

(72) Inventors: Vladimir Victorovich Bezlepkin, St. Petersburg (RU); Valdimir Grigorievich Sidorov, St. Petersburg (RU); Sergey Borisovich Alekseev, St. Petersburg (RU); Sergey Victorovich Svetlov, St. Petersburg (RU); Vladimir Olegovich Kukhtevich, St. Petersburg (RU); Sergey Evgenivich Semashko, St. Petersburg (RU); Teymuraz Georgievich Vardanidze, St. Petersburg (RU); Igor Mihaylovich Ivkov, St. Petersburg (RU)

(73) Assignee: JOINT-STOCK COMPANY SCIENTIFIC RESEARCH AND DESIGN INSTITUTE FOR ENERGY TECHNOLOGIES ATOMPROEKT (JSC "ATOMPROEKT") (RU)

( * ) Notice: Subject to any disclaimer, the term of this patent is extended or adjusted under 35 U.S.C. 154(b) by 0 days.

(21) Appl. No.: 15/532,895

(22) PCT Filed: Nov. 16, 2015

(86) PCT No.: PCT/RU2015/000780
§ 371 (c)(1),
(2) Date: Jun. 2, 2017

(87) PCT Pub. No.: WO2016/089249
PCT Pub. Date: Jun. 9, 2016

(65) Prior Publication Data
US 2017/0336065 A1  Nov. 23, 2017

(30) Foreign Application Priority Data
Dec. 4, 2014  (RU) ................ 2014148909

(51) Int. Cl.
*G21C 15/18* (2006.01)
*F22B 1/02* (2006.01)

(52) U.S. Cl.
CPC ................... *F22B 1/023* (2013.01)

(58) Field of Classification Search
CPC ................ F22B 1/023; G21C 15/18
(Continued)

(56) References Cited

U.S. PATENT DOCUMENTS 5,428,652 A  6/1995  Conrads et al.

FOREIGN PATENT DOCUMENTS

RU  93041194 A  6/1996
RU  96283 U1  7/2010

*Primary Examiner* — Gregory A Wilson
(74) *Attorney, Agent, or Firm* — Colin P. Cahoon; Shaukat A. Karjeker; Carstens & Cahoon, LLP (57) ABSTRACT

The invention relates to the nuclear energy field, including systems for passive heat removal from the pressurized water reactor through the steam generator. The invention increases heat removal efficiency, coolant flow stability and system reliability. The system includes at least one coolant circulation circuit comprising a steam generator and a section heat exchanger above the steam generator in the cooling water supply tank and connected to the steam generator through the inlet and outlet pipelines. The heat exchanger is
(Continued)

divided into parallel sections wherein $L/D \leq 20$, L being the half-section length, D being the header bore, and includes an upper and lower header interconnected by heat-exchange tubes, startup valves with different nominal bores are installed on the outlet pipeline. The inlet and outlet pipeline sections of the circulation circuit comprise a set of branched parallel pipelines individually connected to each of the above heat exchanger sections.

13 Claims, 5 Drawing Sheets

(58) Field of Classification Search
USPC ............ 122/235.14, 235.15, 235.23, 235.29, 122/235.34, 240.3
See application file for complete search history.

SYSTEM FOR PASSIVE HEAT REMOVAL FROM THE PRESSURIZED WATER REACTOR THROUGH THE STEAM GENERATOR

CROSS-REFERENCE TO RELATED APPLICATIONS

The current application is a US 371 National Stage application from PCT/RU2015/000780 filed Nov. 16, 2015, which claims the benefit of priority application RU2014148909 filed Dec. 4, 2014, the disclosures of which are incorporated herein by reference in their entirety.

BACKGROUND OF THE INVENTION

Technical Field

The invention relates generally to the nuclear energy field, and more particularly to systems for passive heat removal from the pressurized water reactor through the steam generator (SG PHRS), and is designed for reactor cooling by natural circulation of the coolant (water) in the system circuit.

Description of Related Art

According to the background of the invention, there exist numerous similar solutions disclosing different configurations of passive heat removal systems.

Russian Utility Model Patent RU78600, G21C15/18 dated Nov. 27, 2008 discloses an emergency heat removal system comprising a steam line and a water line, a condenser-evaporator, and a once-through steam generator. In addition, a water supply tank is connected to the steam and water lines in parallel with the condenser-evaporator, the tank is located in relation to the condenser-evaporator so that the top of the water supply tank is below the top of the condenser-evaporator active surface.

Russian Utility Model Patent RU52245, G21C15/18 dated Mar. 10, 2006 describes a passive reactor cooldown system comprising a water heat exchanger and an air heat exchanger located in an exhaust pipe. The air heat exchanger comprises an ejector installed in the exhaust pipe, the steam generated by the water heat exchanger being the ejector operating medium.

The closest analog of the claimed invention is a system of passive heat removal from the pressurized water reactor through the steam generator disclosed in Russian Utility Model Patent RU96283, G21C15 dated Jul. 20, 2010. The system comprises a coolant circulation circuit including a steam generator connected by an inlet pipeline and an outlet pipeline with the heat exchanger located inside the coolant supply tank installed above the steam generator. A startup device comprising two startup valves with different nominal bores is installed on the outlet pipeline of the heat exchanger. The heat exchanger surface area meets the following criterion:

$$F_{he} \geq \frac{Q_{phrs}}{K_{he} \cdot \Delta t_{he}},$$

where $Q_{phrs} = G_{steam} \cdot r$ is the system output,
$G_{steam}$ is the steam flow at the circulation circuit inlet,
$r$ is the steam generation heat,
$K_{he}$ is the coefficient of heat transfer through the heat exchanger tubing,
$\Delta t_{he}$ is the difference between the saturation temperature in the nuclear reactor containment and saturation temperature under the atmospheric pressure.

However, the said designs do not provide adequate heat removal from the system. Moreover, water hammers are possible in the heat-exchange circuits of the known systems.

SUMMARY OF THE INVENTION

The purpose of the invention is to create an efficient and reliable system for heat removal through the steam generator.

The technical result of the invention is increase of heat removal efficiency, flow stability in the circuit and, consequently, system operation reliability.

The said technical result is achieved owing to the fact that the system for passive heat removal from the pressurized water reactor through the steam generator includes at least one coolant (water) circulation circuit comprising a steam generator and a section heat exchanger located above the steam generator in the cooling water supply tank and connected to the steam generator by means of the inlet pipeline and the outlet pipeline. The heat exchanger includes a lower header and an upper header interconnected by heat-exchange tubes, with startup valves with different nominal bores mounted on the outlet pipeline, and the heat exchanger is divided into parallel sections on the assumption that:

$$L/D \leq 20,$$

where
L is the section half (half-section) length,
D is the section header bore,
and the inlet pipeline and the outlet pipeline sections of the circulation circuit are designed as a set of branched parallel pipelines that are individually connected to each of the above heat exchanger sections.

The above technical result is also achieved in specific options of the invention owing to the fact that:
the heat exchanger is designed so as to provide the relation of pressure loss in the heat exchanger tubes $\Delta P_{tube}$ to pressure loss along the length of the upper header $\Delta P_{head}$ meeting the following criterion:

$$\Delta P_{tube}/\Delta P_{head} \geq 1.5,$$

at least one part of the inlet pipeline from the common line branching point to the top has an upward inclination to an angle of at least 10° in relation to the horizontal line,
the inlet pipeline from the common line branching point to the top comprises sections with an upward inclination of less than 10° in relation to the horizontal line, with length $L_{sec1}$ and diameter $D_{sec1}$, meeting the following criterion:

$$L_{sec1}/D_{sec1} \leq 10,$$

at least one part of the inlet pipeline from the top to the upper heat exchanger header has a downward inclination of at least 10° in relation to the horizontal line,
the inlet pipeline from the upper point to the upper heat exchanger header has sections with a downward inclination of less than 10° in relation to the horizontal line, with length $L_{sec2}$ and diameter $D_{sec2}$, meeting the following criterion:

$$L_{sec2}/D_{sec2} \leq 10,$$

at least one part of the outlet pipeline from the lower heat exchanger header to the point of branch joining into a common line has a downward inclination of at least 10° in relation to the horizontal line, the outlet pipeline from the lower heat exchanger header to the point of branch joining into a common line has sections with a downward inclination of less than 10° in relation to the horizontal line, with length $L_{sec3}$ and diameter $D_{sec3}$, meeting the following criterion:

$L_{sec3}/D_{sec3} \leq 10$, the top point of the inlet pipeline is located outside the cooling water supply tank, the heat exchanger sections have heat-exchange tubes in the rows in the staggered position, the minimum spacing between any adjacent heat-exchange tubes in the heat exchanger section is 50 mm, the heat-exchange tubes in the heat exchanger section have sections with a downward inclination of at least 10° in relation to the horizontal line, the system comprises four independent channels, each containing one the said circulation circuits.

Experiments show that the above said system parameter correlations provide the most efficient heat removal from the steam generator owing to the optimized design of the inlet pipeline and the outlet pipeline of the system, individual coolant supply to and removal from the heat exchanger sections, optimally minimized correlation between the half-section length and heat exchanger header bore, and the best relative positioning of the heat exchanger tubes.

The correlation of the half-section length and bore of the heat exchanger headers is selected so as to minimize the non-uniformity of coolant flow distribution among the heat exchanger tubes, i.e. to reduce the so-called "header effect". The uniform distribution of flow in the tubing is one of the main conditions for improved energy efficiency and performance of heat exchangers. One of the methods used to improve coolant distribution among the header heat exchanger channels is pressure loss reduction of the medium flow in the header. This is achieved by reducing the header length and increasing its bore within the device manufacturing process capabilities and other design features. For headers meeting the L/D≤20 criterion, pressure loss along the header length is minimal, and distribution of coolant flows among the heat exchanger tubes is the most uniform. When the said criterion is exceeded, the uniformity of medium distribution among the heat exchanger channels degrades, which results in the coolant mass flow instability and, subsequently, reduced heat output of the heat exchanger.

BRIEF DESCRIPTION OF THE DRAWINGS

The design of the invention is illustrated by drawings, where.

DETAILED DESCRIPTION

The claimed system is a combination of coolant (water) circulation circuits. In the preferable embodiment of the invention, the claimed system consists of four completely independent channels, each comprising one such circulation circuit.

Figure 1:
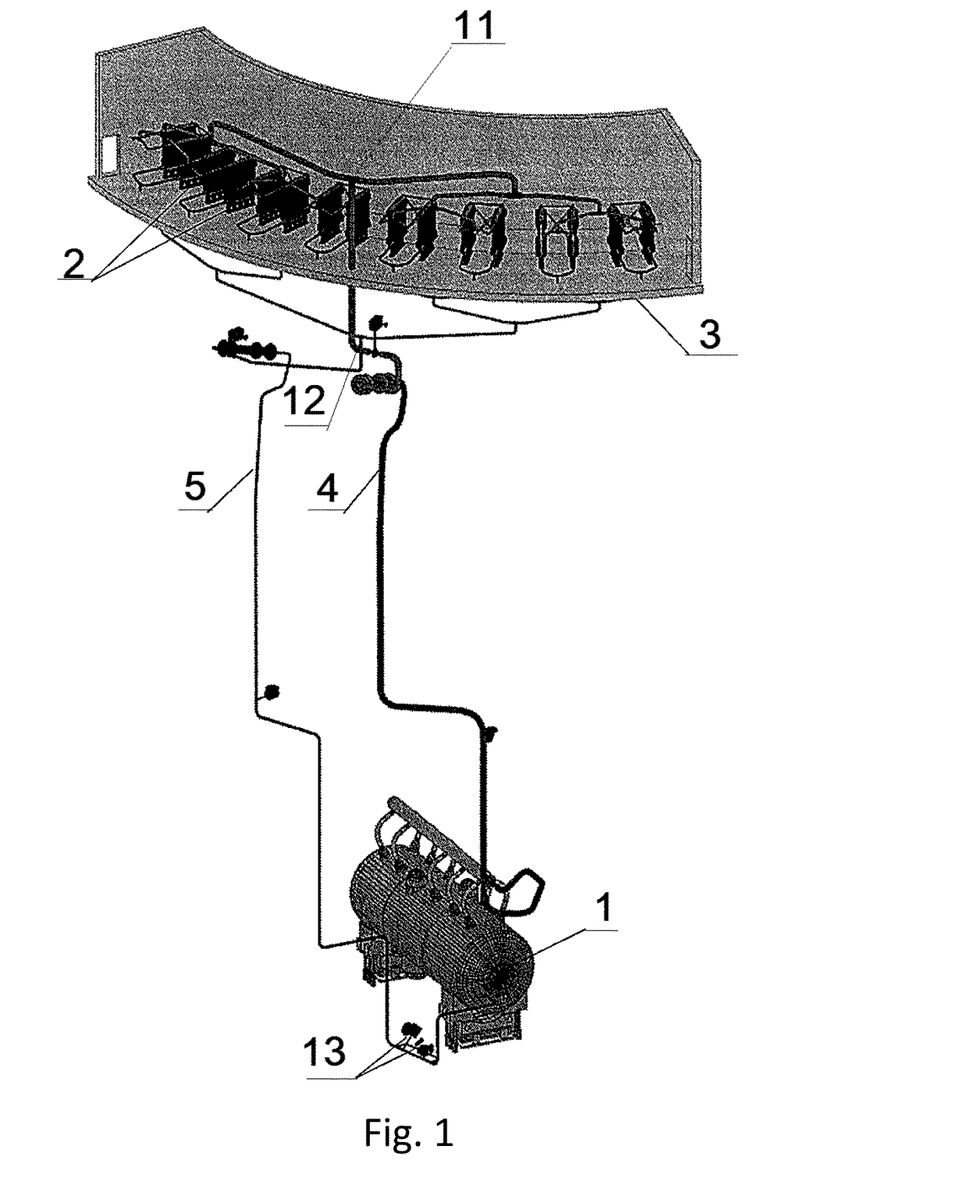
FIG. 1 shows the cooling water circulation circuit design.

The circulation circuit (FIG. 1) comprises a steam generator (1) and a sectional heat exchanger (2) located above the steam generator (1) inside a cooling water supply tank (3). The sections of the heat exchanger (2) are connected to the steam generator (1) by means of an inlet pipeline (4) and an outlet pipeline (5) so that the internal volume of the heat exchanger (2) is connected to the steam volume of the steam generator (1), i.e. the system circulation circuit is closed on its internal volume.

Figure 2:
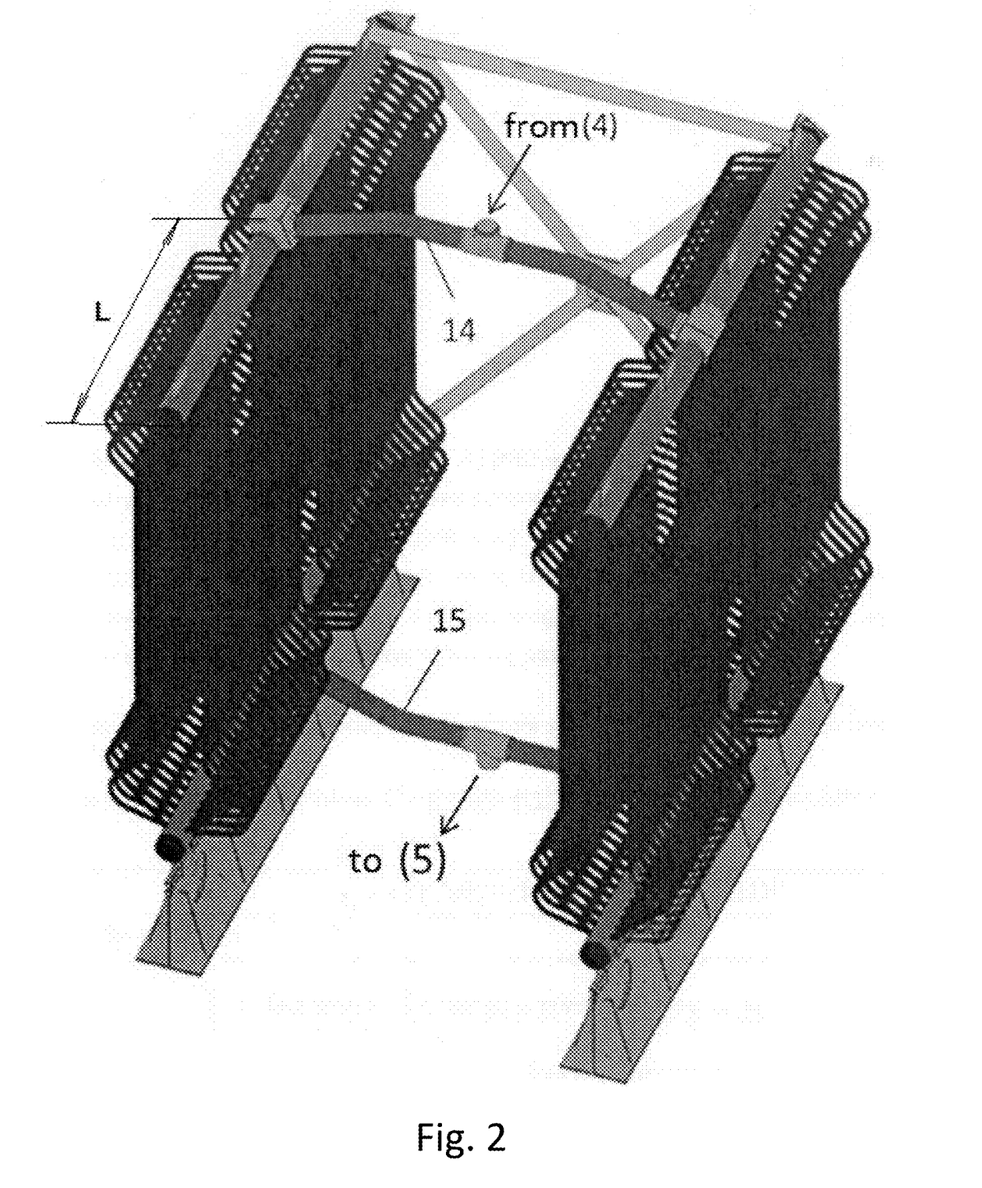
FIG. 2 shows the design of the point of connection of the inlet and outlet pipelines to the heat exchanger section.
Figure 3:
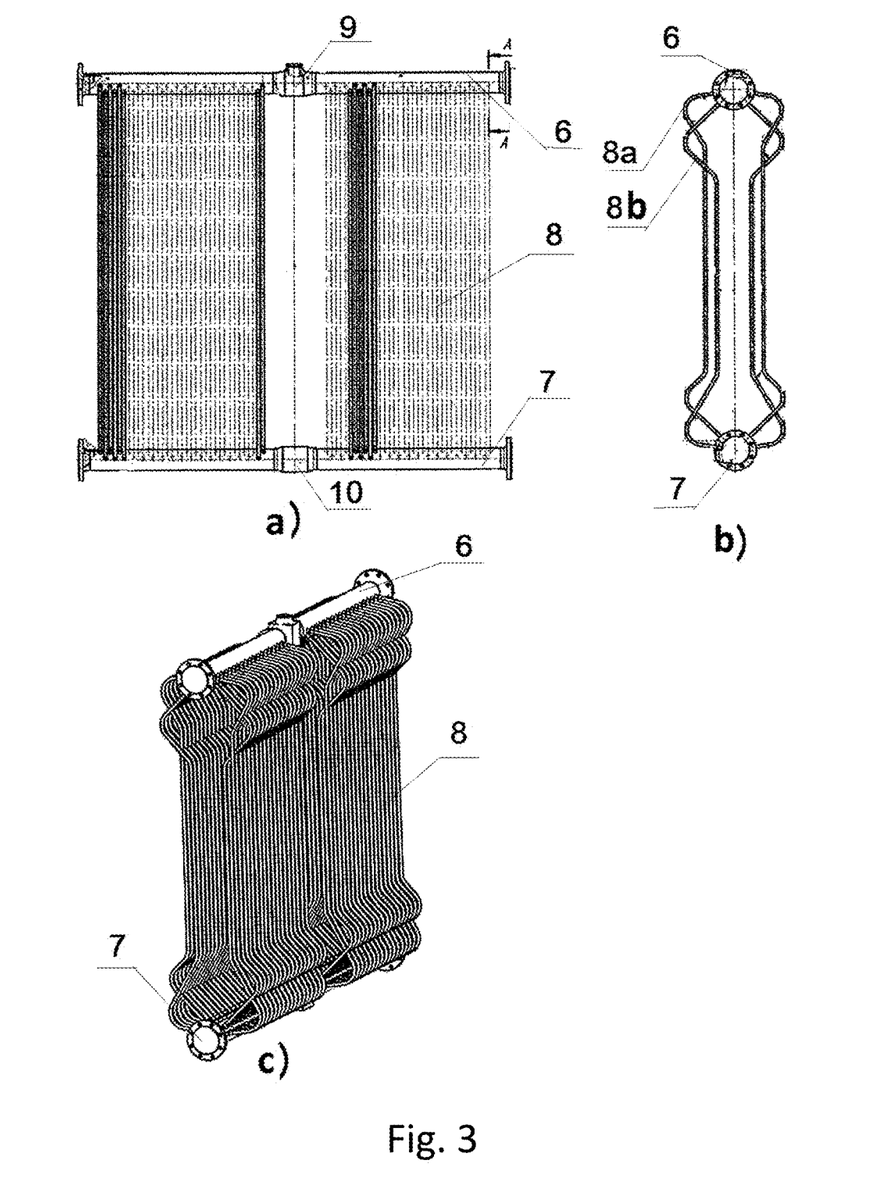
FIG. 3 shows the heat exchanger section design.

The heat exchanger is divided into sixteen parallel heat-exchange sections, each comprising two half-sections (sec FIG. 2, 3). The relation between the half-section length (L) and header bore (D) in the section shall meet the following criterion:

$L/D \leq 20$.

The section of the heat exchanger (2) (FIGS. 3a and 3c) includes an upper header (6) and a lower header (7) interconnected by heat-exchange tubes (8) and an upper T-piece (9) and a lower T-piece (10) installed on the headers for connecting the inlet (4) and outlet (5) pipelines.

In the preferable embodiment, the tubes (8) have bent end sections (interfacing with the headers) and straight central sections. The bent sections have a downward inclination of at least 10° in relation to the horizontal line. The section comprises two types of tubes (8) with different bend configurations: "short" tubes (8a) and "long" tubes (8b) (FIG. 3b). The above tubes are alternating, providing the staggered arrangement of heat-exchange tubes in the rows.

In the specific embodiment of the invention for the Leningrad-2 NPP, the heat-exchange sections are below the water level (H=5.8 m) in the lower part of the tank (3). The heat-exchange bundle of each section consists of 140 bent tubes with the outer/inner diameter of 16/12 mm connected by the upper inlet header and lower outlet headers with the outer/inner diameter of 108/90 mm. The length of a half-section of the upper and lower headers is 960 mm. The minimum spacing between any adjacent heat-exchange tubes is 50 mm. The distance between the headers is 1.95 m, and the average section tube length is 2.124 m. The heat transfer surface area of each section is 14.1 m². Therefore, this specific embodiment of the design has the total heat transfer surface area of each system channel of 239 m².

The outer/inner diameter of the main part of the inlet pipeline (4) to the branching point is 273/233 mm, and the outer/inner diameter of the main part of the outlet pipeline (5) after the branching point is 108/90 mm.

To eliminate the header effect during operation of sixteen parallel heat exchanger sections, the system design has no common distribution and collection headers. For this purpose, the inlet pipeline (4) and the outlet pipeline (5) sections of the circulation circuit are designed as a set of branched parallel pipelines that are individually connected to each heat exchanger section (sec FIG. 1). Each heat exchanger section has an individual connection as section (14) from the inlet pipeline (4) and an individual connection as section (15) to the outlet pipeline (5) (FIG. 2). The above sections (14) and (15) are connected to the headers (6) and (7) in the central points dividing the heat exchanger section into the said two half-sections (see FIG. 2, 3).

In the preferable embodiment of the invention, the inlet pipeline (4) has a top branching point (11) dividing the pipeline (4) into two branches, each branch is further divided into two branches, etc. Thus, the inlet pipeline is divided into 16 branches, each connected to the upper T-piece (9) of the relevant section. The top point of the inlet pipeline is located outside the cooling water supply tank. Two heat exchanger half-sections jointly forming each of the 16 heat exchanger sections are connected to the upper T-piece (9) and the lower T-piece (10).

The outlet pipeline (5) with a lower branching point (12) has a similar branching with its branches connected to the lower T-pieces (10) of the sections.

The relation of pressure loss in the heat exchanger tubes $\Delta P_{tube}$ to pressure loss along the length of the upper header $\Delta P_{head}$ meeting the following criterion:

$$\Delta P_{tube}/\Delta P_{head} \geq 1.5.$$

The inlet pipeline from the common line branching point to the top point has an upward inclination in relation to the horizontal line, and a downward inclination in the section between the top point and the upper heat exchanger header. The outlet pipeline also has a downward inclination. The pipeline inclination angle is at least 10°. This is with the exception of certain pipeline sections with an inclination above 10°, with the relation between their length $L_{sec}$ and diameter $D_{sec}$ meeting the criterion:

$$L_{sec}/D_{sec} \leq 10.$$

Two startup valves (13) with different nominal bores are installed on the outlet pipeline (5) in parallel: "large" and "small" The valves provide automatic actuation of the system in the relevant cooldown mode. In the standby mode, the startup valves are closed.

In a specific embodiment of the invention, the "small" startup valve with the nominal bore of DN50 is mounted on the 57×5.5 mm bypass line connected to the main downtake pipeline by T-pieces. A manual control valve is installed downstream of the "small" valve on the bypass line for controlling the condensate flow. A solenoid valve is used as the "small" startup valve. The valve is normally opened.

The "large" startup valve with the nominal bore of DN100 is mounted on the pipeline between the points of connection of the bypass line with the "small" valve. Similarly, a manual control valve is installed on the section for controlling the condensate flow. An electrically operated valve is used as the "large" valve. The valve is normally closed. The "large" valve opens automatically upon signals from the APCS (automatic process control system). The maximum capacity of one SG PHRS channel with the "large" valve open at water temperature of 30° C. in the tank is about 52 MW. When the "small" valve is operated under similar conditions, the capacity is about 28 MW.

The system operates in the following manner.

To begin operation, one of startup valves (13) is opened. This starts the natural coolant circulation circuit with steam supplied from the steam space of the steam generator (1) to the heat exchanger sections (2) through the inlet pipeline (4). The steam is condensed in the heat exchanger and the generated condensate is drained to the steam generator (1) through the outlet pipeline (5). When the steam is condensed inside the heat exchanger (2) tubing, heat energy is transferred from the circulation circuit coolant to the cooling water in the tank (3). After the cooling water is heated up to the boiling level, the steam is generated from the water volume of the tank, followed by its release into the environment. Thus, heat is removed from the steam generator to the environment.

For experimental justification of the proposed SG PHRS design operability and efficiency, extensive research has been performed on the SG PHRS large-scale stand at NPO CKTI. The coefficient of volumetric and capacity resemblance of the model with the full-scale installation is approximately 1:110.

Figure 4:
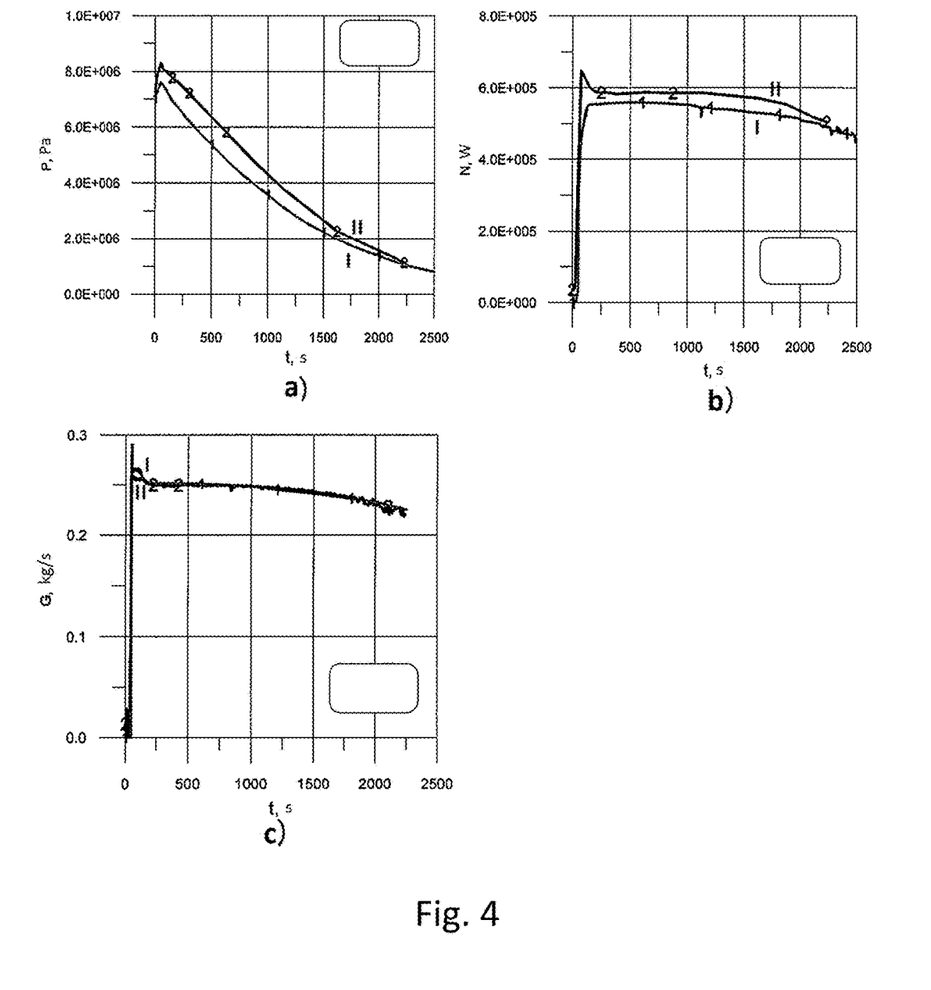
FIG. 4 shows the calculated (I) and experimental (II) time functions of pressure in the steam generator, heat exchanger heat output, and coolant flow in the SG PHRS circuit during reactor plant cooldown in case of an accident.

FIG. 4 shows the research results for simulation of reactor plant cooldown in case of an accident with power unit blackout showing the dependencies of pressure in the steam generator model (a), heat capacity (b) and coolant flow (c) on the simulated accident process time. Line I shows the values calculated using the KORSAR code, and line II shows the experimental data.

The calculated and experimental results of the research show that the claimed system removes heat reliably with no coolant mass-flow rate and temperature perturbation and provides a steady steam generator pressure decrease. There is no water hammering during the plant startup and cooldown. In addition, the experimental and calculated data are fairly consistent.

Figure 5:
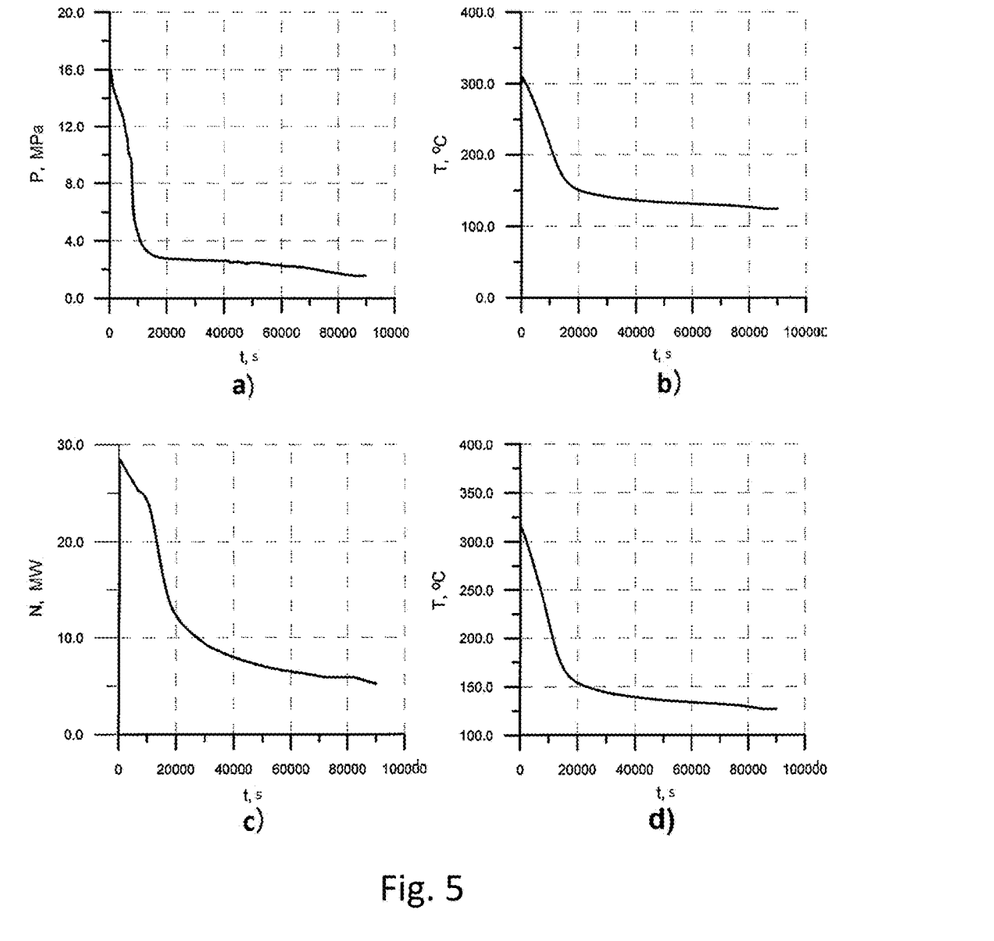
FIG. 5 shows time functions of pressure above the core, coolant temperature at the core outlet, system channel capacity and maximum temperature of the fuel element cladding during reactor plant cooldown in case of an accident.

FIG. 5 shows the calculation results for a beyond design basis accident with a long-term power unit blackout for 24 hours showing the dependencies of the above-core pressure (a), core outlet coolant temperature (b), SG PHRS channel capacity (c), and maximum fuel element cladding temperature (d) on the accident process time.

As is evidenced by the calculation and experimental justification, the claimed system with the said parameters provides steady natural coolant circulation during heat removal from steam generators under all reactor plant accident modes when the system is to function.

Therefore, the claimed system provides efficient and reliable cooldown of the reactor plant in all considered accident modes. Application of the system during accidents involving power unit blackout and complete failure of the feed water supply ensures self-contained operation of the reactor plant for 24 hours after the beginning of an accident.

The invention claimed is:

1. A system for passive heat removal from a pressurized water reactor through a steam generator including at least one coolant circulation circuit comprising a steam generator and a sectional heat exchanger located above the steam generator inside a cooling water supply tank and connected to the steam generator by means of an inlet pipeline and an outlet pipeline, the heat exchanger comprising a lower header and an upper header interconnected by heat-exchange tubes, and with startup valves with different nominal bores mounted on the outlet pipeline, wherein the heat exchanger is divided into sections positioned in parallel based on the assumption that:

$$L/D \leq 20, \text{ where}$$

L is the half-section length,
D is the header bore,
and the inlet pipeline and the outlet pipeline sections of the circulation circuit are designed as a set of branched parallel pipelines that are individually connected to each of the above heat exchanger sections.

2. A system as defined in claim 1, wherein the heat exchanger is designed so as to provide the relation of pressure loss in the heat exchanger tubes $\Delta P_{tube}$ to pressure loss along the length of the upper header $\Delta P_{head}$ meeting the following criterion:

$$\Delta P_{tube}/\Delta P_{head} \geq 1.5.$$

3. A system according to claim 1, wherein at least one part of the inlet pipeline from the common line branching point to the top has an upward inclination to an angle of at least 10° in relation to the horizontal line.

4. A system according to claim 3, wherein the inlet pipeline from the common line branching point to the top comprises sections with an upward inclination of less than 10° in relation to the horizontal line, with length $L_{sec1}$ and diameter $D_{sec1}$, meeting the following criterion: $L_{sec1}/D_{sec1} \leq 10$.

5. A system according to claim 1, wherein at least one part of the inlet pipeline from the top to the upper heat exchanger header has a downward inclination of at least 10° in relation to the horizontal line.

6. A system according to claim 5, wherein the inlet pipeline from the upper point to the upper heat exchanger header has sections with a downward inclination of less than 10° in relation to the horizontal line, with length $L_{sec2}$ and diameter $D_{sec2}$, meeting the following criterion: $L_{sec2}/D_{sec2} \leq 10$.

7. A system according to claim 1, wherein at least one part of the outlet pipeline from the lower heat exchanger header to the point of branch joining into a common line has a downward inclination of at least 10° in relation to the horizontal line.

8. A system according to claim 7, wherein the outlet pipeline from the lower heat exchanger header to the point of branch joining into a common line has sections with a downward inclination of less than 10° in relation to the horizontal line, with length $L_{sec3}$ and diameter $D_{sec3}$, meeting the following criterion: $L_{sec3}/D_{sec3} \leq 10$.

9. A system according to claim 1, wherein the top point of the inlet pipeline is located outside the cooling water supply tank.

10. A system according to claim 1, wherein the heat-exchange tubes in the rows of the heat exchanger sections are staggered.

11. A system according to claim 1, wherein the minimum spacing between any adjacent heat-exchange tubes in the heat exchanger section is 50 mm.

12. A system according to claim 1, wherein the heat-exchange tubes in the heat exchanger section have sections with a downward inclination of at least 10° in relation to the horizontal line.

13. A system according to claim 1, wherein the system comprises four independent channels, each containing one the said circulation circuits.

* * * * *